United States Patent [19]

Shore

[11] 3,822,835

[45] July 9, 1974

[54] TAPE CARTRIDGE

[75] Inventor: Paul L. Shore, Potomac, Md.

[73] Assignee: Tapecaster TCM, Inc., Rockville, Md.

[22] Filed: Mar. 23, 1973

[21] Appl. No.: 344,384

[52] U.S. Cl. .......... 242/55.19 A

[51] Int. Cl. .......... B65h 17/48

[58] Field of Search ...... 242/55.19 A, 55.19 R, 199, 242/200; 179/100.2 Z; 274/4 B

[56] References Cited

UNITED STATES PATENTS

| | | | |
|---|---|---|---|
| 2,778,880 | 1/1957 | Eash | 242/55.19 A X |
| 2,922,642 | 1/1960 | Cousino | 242/55.19 A |
| 2,940,753 | 6/1960 | Nygaard | 242/55.19 R |
| 3,032,613 | 5/1962 | Namenyi-Katz | 179/100.2 Z |
| 3,252,670 | 5/1966 | Smith | 242/55.19 A |
| 3,481,551 | 12/1969 | Steelman | 242/55.19 A |
| 3,482,792 | 12/1969 | Auld | 242/55.19 A |
| 3,511,449 | 5/1970 | Mathus et al. | 242/55.19 A |
| 3,637,152 | 1/1972 | Okamoto | 242/55.19 A |

*Primary Examiner*—Billy S. Taylor
*Attorney, Agent, or Firm*—Milton M. Field

[57] ABSTRACT

An endless tape cartridge is designed to reduce azimuth and phase errors. The tape is guided from the innermost convolution of the coil to a point on one side wall of the cartridge housing near a rear corner and is moved along this wall and around a machined metal guide post at the corner of the side wall and the front wall of the housing. A frictional drag is imparted to the tape by a foam pad which engages the tape at a point along the side wall, thus adjusting the tension in the tape before it is guided by the machined guide post. In order to rigidify the cartridge housing, the top and bottom walls thereof are provided with deep ribs, and tongue and groove mating is used between the cover and base of the housing. The cartridge also includes foam backing pads adjacent the transducer openings. These pads include a relatively rigid plastic base and a foam body. The rigid base is received between spaced posts on opposite sides of the pad, the front post of each pair of gripping and deforming the foam body to retain the pressure pad in position.

4 Claims, 10 Drawing Figures

TAPE CARTRIDGE

BACKGROUND OF THE INVENTION

The present invention relates to an endless tape cartridge for use with magnetic sound tape recording and reproducing apparatus.

Endless magnetic tape cartridges, which include an endless tape coil mounted on a single reel and means for guiding the tape past openings for receiving transducer heads and a drive capstan, have come into wide use. Radio broadcasters, in particular, depend upon cartridge tape equipment to produce much of today's programming. However, to a great extent, the sound quality is limited by the performance of the cartridge itself.

Originally, the endless tape cartridge was not designed for broadcast use. The first cartridges were used in the background music field and in other, less demanding, fields. The first use of tape cartridges in broadcasting occurred in the late 1950's, and the cartridge concept grew at an exponential rate in spite of quality and reliability problems. The early machines were plagued with numerous problems due, to a large extent, to deficiencies in the cartridge itself. These early machines suffered from eratic loss of frequency response. This was primarily caused by the unstable front left corner post in the cartridge, and the decision to place the audio head on the left and the cue head on the right. The poor quality caused some agencies and advertisers to give instructions not to dub their spots to cartridges. This problem was somewhat minimized, when a manufacturer designed equipment with the audio head on the right.

However, in 1961, a committee was formed by NAB to set standards. This committee compromised and set standards around existing equipment and existing cartridges. While the standards were desparately needed, little was done to perfect a better cartridge for broadcast applications. Indeed, the committee set a standard requiring that the recording be on the left head and the playback be on the right head. Accordingly, the deficiencies of the cartridge again became paramount.

In most cartridge designs, the tape changes its axis when traveling around the front left corner post. Because this post is located so close to the left head, the tape is unable to stabilize before it passes across this head. As a result, it is difficult to control the skew, or azimuth alignment, of the tape. When the tape skew in playback is different from the skew in recording, there is a phase shift between the two channels of the tape which will greatly degrade the stereophonic (summed) signal and will also degrade monophonic signals. In particular, relatively small azimuth errors will produce substantial phase differences and sharp losses in the high frequency response.

Some manufacturers have tried to correct this deficiency in design by adding an adjustable corner post. While this may reduce the problem, it increases costs by a large factor and adds an adjustment. This is undesirable, because this adjustment is subject to tampering and may change if the cartridge is mishandled, requiring further adjustment.

SUMMARY OF THE INVENTION

It is accordingly the principal object of the present invention to provide an improved endless tape cartridge.

More specifically, it is an object of the invention to provide an endless tape cartridge which reduces azimuth and phase errors.

To this end, the invention contemplates an endless tape cartridge having a housing enclosing an endless coil of magnetic tape. A loop of tape extends from the innermost convolution of the coil and returns to its outermost convolution. This loop of tape is guided from the innermost convolution by a guide wire extending between the innermost convolution and the rear wall of the housing to a first guide pin adjacent the rear wall, to a second guide pin adjacent a side wall near the corner between the side wall and the rear wall, and around a precision machined metal guide post positioned at the corner between the side wall and the front wall. A friction drag is applied to the tape along the side wall by a foam pad which engages the side of the tape opposite to the side engaged with the side wall. In this way, the tension in the tape is adjusted before it is received by the machined guide post so that the tape may be fed accurately in proper alignment past the openings for the transducer heads. In order to further improve the accuracy of the tape position relative to the transducer heads, the housing base and cover are rigidified by the provision of deep ribs, and tongue and groove mating is used between the cover and base.

Other features of the invention include the provision of a friction drag pad retaining wall parallel to the side wall for retaining the friction pad in engagement with the tape. A shoulder extends from the front edge of this wall to prevent movement of the pad in the direction of the front wall of the cartridge as the tape is pulled around the front corner post. The invention also contemplates the provision of improved means for retaining foam backing pads opposite the transducer head openings. This means takes the form of pairs of spaced posts which are positioned to receive the ends of a rigid base plate of a pressure pad, the front one of each pair of posts engaging and deforming the foam body of the pressure pad to retain it in position. The invention also contemplates improved, and simple means, for positioning the guide wire, which extends between posts adjacent each side of the housing, the wire having bent ends received in bores in these posts.

The foregoing and other objects, features, and advantages of the invention will become readily apparent from the following detailed description of a preferred embodiment of the invention with reference to the accompanying drawings.

DETAILED DESCRIPTION OF THE PREFERRED EMBODIMENT

Figure 1:
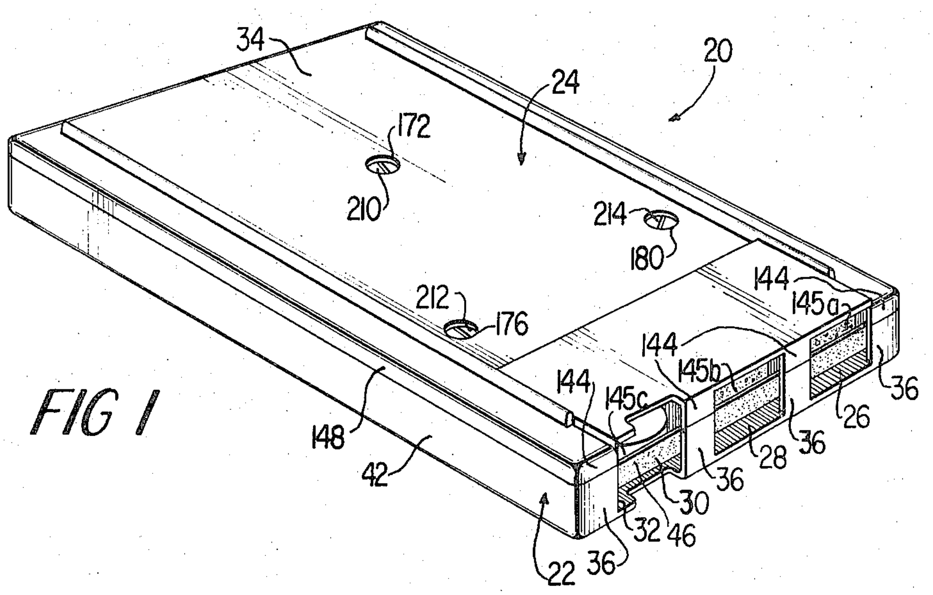
FIG. 1 is a perspective view of a tape cartridge of the invention.

Referring to FIG. 1 of the drawing, a tape cartridge 20 of the invention is shown, the cartridge being provided with a housing formed by a molded plastic cartridge base portion 22 and a molded transparent plastic cover portion 24. As will be explained more fully hereinafter, cover portion 24 is secured to base portion 22 by three screws 210, 212, and 214. The front wall 36 of the cartridge housing is provided with a plurality of openings 26, 28, and 30 which are provided, respectively, to receive a transducer head 220, a transducer head 222, and a drive capstan 224, which are shown in phantom line in FIG. 2. From FIGS. 1, 2, and 3, it will be seen that the housing includes a bottom wall 32 spaced from a top wall 34 and a front wall 36, a rear wall 38, and a pair of side walls 40 and 42.

Figure 6:
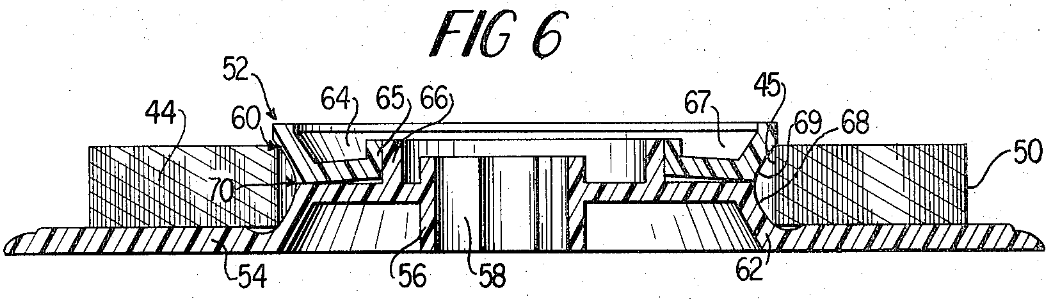
FIG. 6 is an enlarged section view of the tape reel of the cartridge of FIG. 1.

It is the purpose of the tape cartridge 20 of the present invention to provide a convenient means for supplying magnetic tape to a recorder-playback magnetic tape machine. To this end, an endless coil 44 of magnetic tape is provided. The tape includes a tape loop 46 which extends from an innermost convolution 45 (FIG. 6) of coil 44 and is returned to an outermost convolution 50 thereof. Coil 44 is mounted on a coil reel 52 which includes a relatively flat disc portion 54 for supporting coil 44. It will be noted from FIG. 6 that the disc portion 54 supports at its center a spindle hole structure 56 which is shaped to form a spindle hole 58. Referring, again, to FIG. 2, it will be seen that spindle hole 58 is received on a spindle 59 upstanding from bottom wall 32 of base portion 22. Reel 52 includes a central upstanding hub structure 60, the bottom portion 62 of which is formed from the central portion of disc 54. A separate top portion 60 is provided with a circular inner wall 65 which is received about an upstanding circular wall 66 which projects upwardly from lower portion 62. It will be understood that upper portion 64 is welded to lower portion 62 by an ultrasonic welding technique, both portions being molded from Delrin, an acetyl resin. It will be noted that when parts 62 and 64 are thus united, a groove 70 is formed by groove surfaces 68 of part 62 and 69 of part 64. This groove is arcuate in nature, being formed with a curve which is generally hyperbolic. When groove 70 is provided with this shape, it has been found that the innermost convolution of the tape flows out of groove 70 more freely, thereby providing less wow and flutter.

Figure 2:
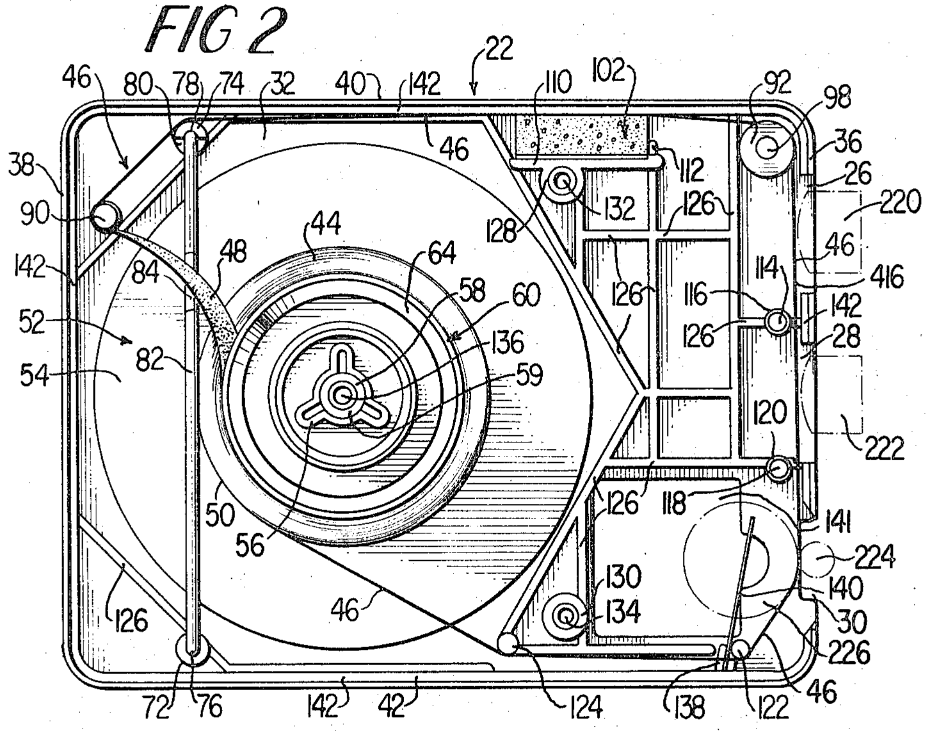
FIG. 2 is a plan view of the base portion of the cartridge of FIG. 1, with the cover removed and with the transducer heads, capstan, and pinch roller of tape recorder-playback apparatus shown in phantom line.
Figure 3:
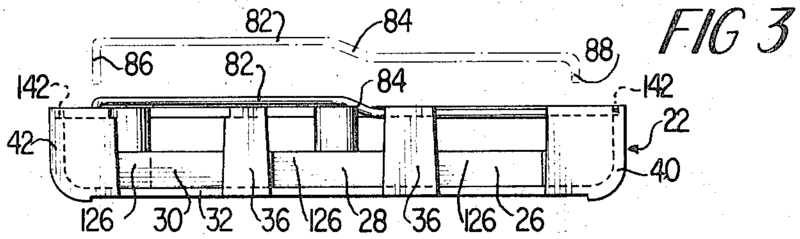
FIG. 3 is a side elevation view of the base portion of FIG. 2 with the wire guide being shown lifted from the base in phantom line.

In order to guide tape loop 46 from the innermost convolution of tape coil 44, tape guide means are provided. In particular, this guide means includes a guide wire 82 which extends across the housing between the innermost convolution of tape coil 44 and rear wall 38 of the housing. In order to support wire guide 82, a pair of posts 72 and 74 are provided adjacent respective side walls 42 and 40. It will be noted that post 72 is provided with a central bore 76 and that post 74 is provided with a central bore 78. These bores receive vertical bent end portions 86 and 88 of wire guide 84 which is thus readily placed in position and rigidly supported. Wire guide 82 includes an inclined portion 84 which serves to guide and twist a portion 48 of the tape as it is pulled from the innermost convolution of tape coil 44. Because of inclined portion 84, the end of wire guide 82 received in post 74 is at a lower elevation than the top of post 74. It is therefore necessary to remove a portion of post 74 to form a shoulder 80 which supports the top end of wire guide 82 (as seen in FIG. 2).

Figure 9:
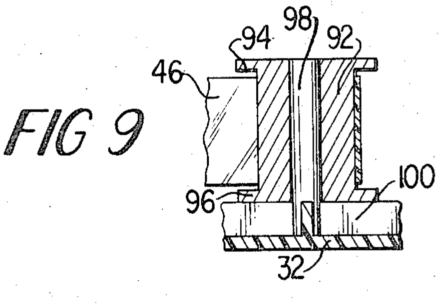
FIG. 9 is a section view showing the mounting of the machined guide post of the invention and a section of tape extending therearound.

Wire guide 82 serves to guide twisted portion 48 to a vertical guide pin 90 adjacent rear wall 38 of the housing. Guide pin 90 serves to realign the tape loop 46 to a vertical plane and directs it about post 74 which serves as a second guide pin adjacent side wall 40. From guide pin 74 the tape loop 46 runs along side wall 40 being directed around a precision machined nickel plated brass guide post 92. As best seen in FIG. 9, guide post 92 is received on a mounting pin 98 upstanding from a rib 100 molded on the lower wall 32 of cartridge base portion 22. It will be noted that guide post 92 includes an upper flange 94 and a lower flange 96 which are spaced apart by a distance which is precisely equal to the width of tape loop 46. In this way, the tape loop is precisely guided past transducer heads 220 and 222 with proper alignment and azimuth.

In order to insure that guide post 92 receives tape loop 46 in a proper position for accurate feeding therearound, a friction drag pad 102 is provided. This pad presses against tape loop 46 with tape loop 46 positioned between pad 102 and side wall 40. Pad 102 brakes tape loop 46 by providing a frictional drag thereon, thereby controlling the tension of the tape loop as it leaves pad 102 and approaches guide post 92, and damps flutter in the tape loop, thus serving as a flutter filter.

Figure 7:
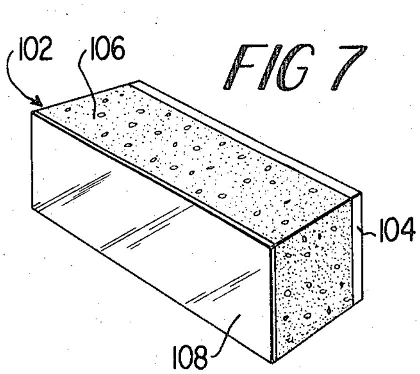
FIG. 7 is a perspective view of the friction drag pad of the invention.

Turning to FIG. 7, it will be seen that friction drag pad 102 comprises a relatively rigid base portion 104 formed of a styrene plastic. Adhesively secured to base 104 is a foam body 106 which may be formed from a polyurethane foam. Finally, to insure low friction between pad 102 and tape loop 46, a Mylar or Teflon film 108 is adhesively secured to the contacting surface of foam pad 102. In order to properly maintain friction pad 106 in position, a friction pad retaining wall 110 is molded in base portion 22, being upstanding from bottom wall 32 and parallel to side wall 40. The dimensions of friction pad 102 are such that it is slightly compressed by engagement between pad retaining wall 110 and tape loop 46 and side wall 40 to maintain the proper pressure against tape loop 46. Since tape loop 46 is being pulled forwardly toward guide post 92 by drive capstan 224, there would be a tendency to drag pad 102 forwardly. In order to prevent this, a shoulder 112 is formed on the front end of retaining wall 110, extending towards side wall 40, to block such movement of pad 102.

Figure 8:
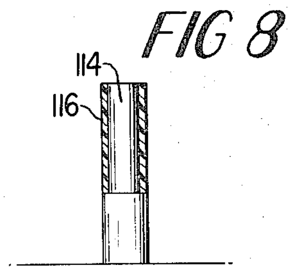
FIG. 8 is a section view of a guide pin of the invention.

After tape loop 46 is guided to the front of the cartridge by guide post 92, it is driven past openings 26, 28 and 30. When, however, the tape is engaged by tape heads 220 and 222, it will be brought into engagement with a pair of guide pins 114 and 118 which are molded in upstanding fashion from bottom wall 32 of base portion 22. In order to reduce the friction on the tape from these pins, they are provided with Teflon sleeves 116 and 120 respectively. This is most clearly shown in FIG. 8.

Tape loop 46 is driven by capstan 224, the tape passing between capstan 224 and a pinch roller 226. It then passes over a guide pin 122 adjacent side wall 42 near front wall 36. From guide pin 122, the tape passes over a guide pin 124 and is thence returned to the outermost convolution 50 of tape coil 44.

In order to rigidify the tape cartridge, and thus improve the accuracy of tape feed to the transducer heads, it is provided with substantial ribs. Thus, referring to FIG. 2, cartridge base portion 22 is provided with ribs 126 which are molded with the bottom wall 32. A plurality of screw posts 128 and 130 are provided on opposite sides of base portion 22 to receive the screws retaining cover 24 thereon as will be presently explained. For this purpose screw post 128 is provided with a threaded metal sleeve 132, and screw post 130 is provided with a threaded metal sleeve 134. In like manner, spindle 59 contains a central bore receiving a threaded metal sleeve 136.

Adjacent guide post 132 is a spring retaining rib 138 which is slotted to receive one end of a spring member 140. Spring member 140 is engaged by pinch roller 226 when it is pivoted upwardly through an opening 141 in bottom wall 32 of the cartridge and serves to bias pinch roller 226 back toward its retracted position when the solenoid which pivots pinch roller 226 through opening 141 is deenergized. The spring also serves to maintain firm engagement of cartridge 20 with tape heads 220 and 222.

In order to further rigidify the cartridge housing and thus maintain the accuracy of tape feed to the transducer heads, tongue and groove mating between base portion 22 and cover portion 24 is provided. To this end, the upper edge of base portion 22 is provided with a shoulder 142 which, as will be presently explained, will engage a complementary shoulder provided on cover portion 24.

Figure 4:
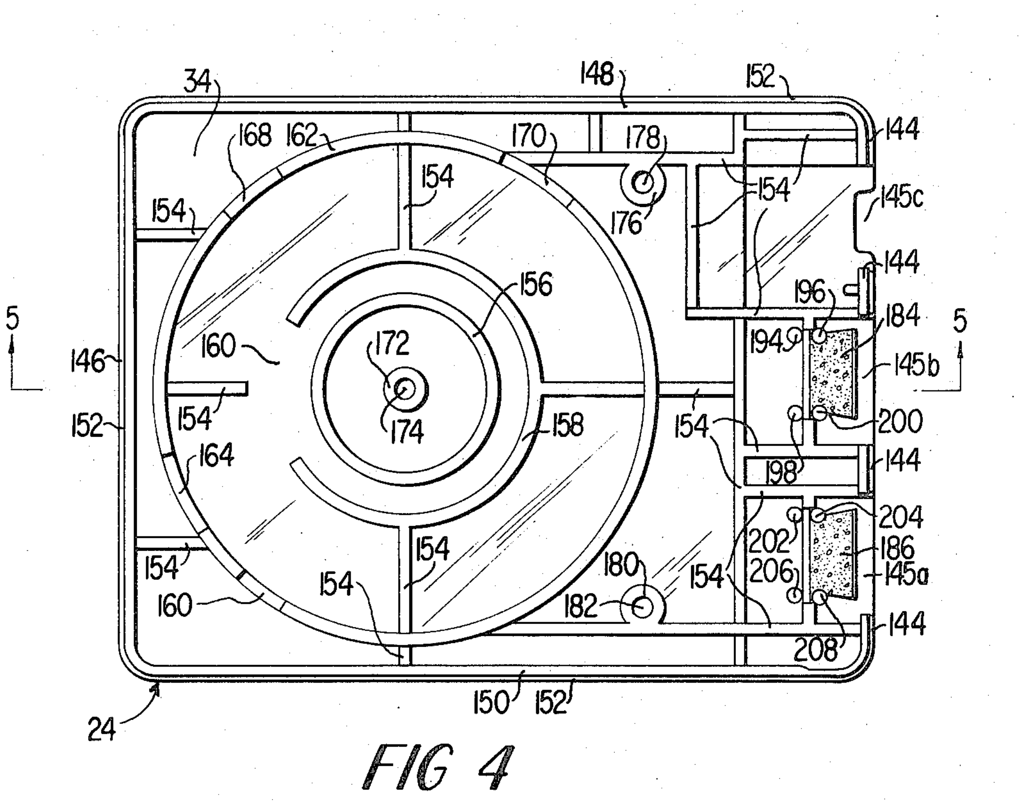
FIG. 4 is a bottom view of the cover of the tape cartridge of FIG. 1.
Figure 5:
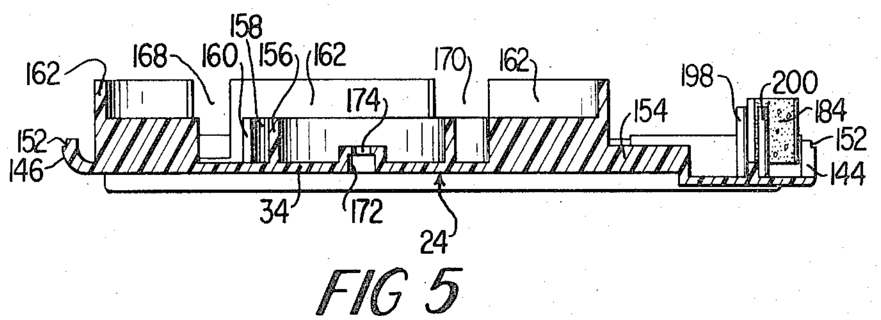
FIG. 5 is a section view along the lines 5 — 5 of FIG. 4.

Turning now to FIGS. 4 and 5, it will be noted that cover portion 24 includes top wall 34 and a front lip 144 provided with gaps **145*a*, 145*b*, and 145*c*. corresponding respectively, to openings 26, 28, and 30. A rear lip 146 is provided to interengage with rear wall 38, and side walls 148 and 150 are provided for interengagement, respectively, with side walls 42 and 40 of base portion 22. For interengagement with shoulder 142 of base portion 22, the outer lips of cover portion 24 are provided with a shoulder 152.** By virtue of this tongue and groove type engagement, further rigidification of the housing is provided.

By the same token, cover portion 34 is rigidified by the provision of substantial molded ribs 154. In addition, a central circular rib 156 is provided to be received within a central well 67 of hub portion 60 (see FIG. 6). A circular rib 158 is provided to engage around the outer periphery of top portion 64 of central hub 60 and includes an opening 160 permitting the passage of tape loop portion 48 from the innermost convolution of the tape coil 44. An outer circular rib 162 is provided and contains a plurality of openings 164, 166, 168, and 170. Opening 164 provides for passage of tape loop portion 48 to guide pin 90. Openings 160 and 168 are provided to permit the positioning of wire guide 82 across the cartridge, while opening 170 is provided for receiving tape loop 46 on its return to outermost convolution 50 of tape coil 44.

In order to facilitate connection of cover portion 24 to base portion 22, a plurality of screw head wells and screw holes are provided. Thus, at a position corresponding to spindle 59, top wall 34 is molded to form a screw head receiving well 172 having a screw hole 174. In like manner, top wall 34 is molded to provide a pair of screw head receiving wells 176 having a screw hole 178 and 180 having a screw hole 182. It will be understood that these screw holes are aligned with threaded metal sleeves 134 and 132, respectively. Referring to FIG. 1, it will be seen that screws 210, 212, and 214 are received in respective screw head receiving wells 172, 176 and 180, being engaged with threaded metal sleeves 136, 132, and 134 for securely maintaining cover portion 24 on cartridge base portion 22.

As will most clearly be seen from FIGS. 4 and 5, a pair of pressure pads 184 and 186 are retained on cover portion 24. These pads cooperate with the transducer heads serving as backing pads when the transducer heads engage the opposite side of tape loop 46. This is most clearly shown in FIG. 10, where transducer head 222 engages one side of tape loop 46, while pressure pad 184 engages the opposite side thereof. It is to be understood that the same arrangement is effected between tape head 220 and pressure pad 186.

Figure 10:
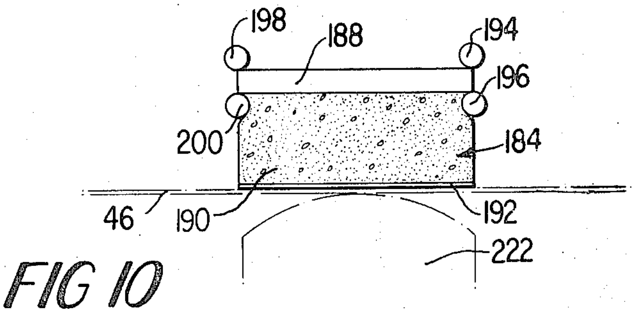
FIG. 10 is an enlarged plan view of a pressure pad assembly of the invention, with a magnetic tape and tape head being shown in phantom line.

As is most clearly seen in FIG. 10, pressure pad 184 is formed from a relatively rigid styrene base 188 to which is adhesively secured a polyurethane foam body 190. In order to reduce the friction between foam body 190 and tape loop 46, a film of Mylar or Teflon 192 is adhesively secured to its contacting surface. It will be understood that pressure pad 186 is constructed in the same way.

In order to releasably secure the pressure pads on cover portion 24, a special arrangement of retaining pins is provided. Thus, molded and extending from top wall 34 are two pairs of pins 194 and 196 and 198 and 200 which are spaced apart a distance sufficient to receive therebetween rigid base portion 188 of pressure pad 184. Since pins 196 and 200 are spaced apart a distance which is smaller than the width of foam body portion 190, these pins serve to pinch foam body portion 190 and retain pressure pad 184 in its position. Preferably, the length of base 188 and foam body 190 should be equal to the distance between the centers of pins 196 and 200; and the distance between pin 194 and pin 196 and between pin 198 and pin 200 should be slightly greater than the thickness of base portion 188. In like manner, two pairs of pins 202 and 204 and 206 and 208 serve the same function with respect to pressure pad 186. The base portion of pressure pad 186 fits between pins 202 and 204 and 206 and 208 and the spacing of pins 204 and 208 is such that they deform the foam body of pressure pad 186 to retain it in position.

As previously described, tape cartridge 20 is intended to be used with a recorder-playback magnetic tape machine which includes a pair of magnetic transducer heads 220 and 222. As shown in FIG. 2, these heads, when the cartridge is in position in the machine, extend through openings 26 and 28, respectively, and engage loop 46 pressing it against pressure pad 184 and 186. Moreover, when the cartridge is thus in position in the machine, drive capstan 224 engages against one side of tape loop portion 46. A solenoid in the machine causes a pinch roller 226 to pivot upwardly through opening 141 in lower wall 32 against the bias of spring 140 and into engagement with the other side of tape loop 46. In this way, rotation of drive capstan 224 causes tape loop 46 to be pulled from tape coil 44 and be guided in the manner described.

Cartridge base portion 22 is preferably molded from the high impact plastic alloy, Cycoloy, which is an alloy of acrylonitrile-butadiene-styrene (ABS) and polycarbonate and is supplied by the Marbon Division of Borg-Warner Corporation. Cover portion 24 is preferably molded from the transparent high impact plastic material, Cycolac, which is acrylonitrile-butadienestyrene (ABS), and is obtained from the Marbon Division of Borg-Warner Corporation.

The operation of the cartridge of the present invention will be readily understood from the foregoing. Because tape loop 46 is fed for a substantial distance along side wall 40, it has sufficient time to obtain the proper alignment before being received by machined guide post 92. In addition, the frictional drag provided by frictional drag pad 102 adjusts the tension in tape loop 46 before it is received by guide post 92 and permits guide post 92 to feed tape loop 46 accurately at the proper angle to tape heads 220 and 222. For this reason, the azimuth and orientation of the tape loop is proper and there will be no significant phase error. This result is enhanced by the provisions of ribs to rigidify the cartridge base portion and cartridge cover portion and by incorporating tongue and groove mating of the lips of the cartridge base portion and cartridge cover portion. In this way, a tape cartridge is provided which readily attains the rigorous specifications required of tape cartridges used in the broadcast industry.

While a preferred embodiment of the invention has been shown and described, it will be apparent to those skilled in the art that changes and modifications can be made without departing from the principles and spirit of the invention, the scope of which is defined in the appended claims.

The invention claimed is:

1. An endless tape cartridge for use with a recording-playback machine of the type having at least one transducer head and drive means spaced therefrom for advancing the tape past said transducer head, comprising:

- a housing having spaced top and bottom walls and a front, a rear and two side walls extending between said top and bottom walls, said front wall being provided with at least one opening for receiving said at least one transducer;
- an endless tape coil within said housing, said endless tape coil having a loop of tape extending from its innermost convolution and returning to its outermost convolution;
- guide means for guiding said loop from said innermost convolution to a point on one of said side walls, along said one side wall, around a guide post positioned at the corner between said one side wall and said front wall, along said front wall past said opening, and to said outermost convolution; and
- friction drag means engaging said tape loop along said one side wall for adjusting the tension of said tape loop so that it may be guided accurately by said guide post past said transducer means, said friction drag means comprising a foam pad engaging one side of said tape, the other side of said tape being in engagement with said one side wall.

2. A cartridge as recited in claim 1, further comprising a pad retaining wall spaced from and parallel to said one side wall, said foam pad being retained between said pad retaining wall and said one side of said tape.

3. A cartridge as recited in claim 2, wherein said pad retaining wall includes a shoulder extending from the end of said pad retaining wall most adjacent to said front wall for restraining said foam pad from movement towards said front wall as said tape is pulled towards said front wall by said drive means.

4. An endless tape cartridge for use with a recording-playback machine of the type having at least one transducer head and drive means spaced therefrom for advancing the tape past said transducer head, comprising:

- a housing having spaced top and bottom walls and a front, a rear and two side walls extending between said top and bottom walls, said front wall being provided with at least one opening for receiving said at least one transducer;
- an endless tape coil within said housing, said endless tape coil having a loop of tape extending from its innermost convolution and returning to its outermost convolution;
- guide means for guiding said loop from said innermost convolution to a point on one of said side walls, along said one side wall, around a guide post positioned at the corner between said one side wall and said front wall, along said front wall past said opening, and to said outermost convolution; and
- friction drag means engaging said tape loop along said one side wall for adjusting the tension of said tape loop so that it may be guided accurately by said guide post past said transducer means, said guide means comprising a first guide pin adjacent said rear wall and a second guide pin adjacent said one side wall, said tape loop being guided from said innermost convolution to said first guide pin, and from said second guide pin along said one side wall to said guide post, and said guide means further comprising a guide wire extending over said coil between said innermost convolution and said rear wall, said guide wire having an inclined portion over which said tape is guided as it moves from said innermost convolution to said first guide pin, said cartridge further comprising a pair of posts upstanding from said bottom wall respectively adjacent said two side walls, each of said posts having a central bore for receiving the ends of said guide wire, said ends of said guide wire being bent downwardly from said guide wire and said guide wire being bridged between said posts, one of said upstanding posts being said second guide pin.

* * * * *

UNITED STATES PATENT OFFICE
CERTIFICATE OF CORRECTION

Patent No. 3,822,835 Dated July 9, 1974

Inventor(s) Paul L. Shore

It is certified that error appears in the above-identified patent and that said Letters Patent are hereby corrected as shown below:

In the Abstract, line 19, "of", second occurrence, is deleted.

Signed and sealed this 1st day of October 1974.

(SEAL)
Attest:

McCOY M. GIBSON JR.
Attesting Officer

C. MARSHALL DANN
Commissioner of Patents